(12) United States Patent
Yamaguchi et al.

(10) Patent No.: US 8,096,698 B2
(45) Date of Patent: Jan. 17, 2012

(54) LOAD MONITORING METHOD AND LOAD MONITORING APPARATUS FOR KNEADING APPARATUS

(75) Inventors: Kazuo Yamaguchi, Takasago (JP); Yasuaki Yamane, Takasago (JP); Shigehiro Kasai, Takasago (JP); Koichi Honke, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 588 days.

(21) Appl. No.: 12/325,013

(22) Filed: Nov. 28, 2008

(65) Prior Publication Data
US 2009/0135016 A1 May 28, 2009

(30) Foreign Application Priority Data

Nov. 28, 2007 (JP) ................................. 2007-307624

(51) Int. Cl.
*B29B 7/72* (2006.01)
(52) U.S. Cl. ........................... 366/69; 366/100; 366/142
(58) Field of Classification Search ................ 366/69, 366/100, 142
See application file for complete search history.

(56) References Cited

U.S. PATENT DOCUMENTS
6,328,551 B1 * 12/2001 Takatsugi et al. ............. 425/145

FOREIGN PATENT DOCUMENTS
JP          2000-225641         8/2000
* cited by examiner

*Primary Examiner* — Joseph Del Sole
*Assistant Examiner* — James Sanders
(74) *Attorney, Agent, or Firm* — Oblon, Spivak, McClelland, Maier & Neustadt, L.L.P.

(57) ABSTRACT

In an extruder or a kneader, load (torque T) values on an input shaft portion of a screw shaft are detected by a load detector installed on the input shaft portion, then an overload condition is determined from a load mean value ($T_a$) and a load amplitude value ($T_w$) of the detected load values, and the issuance of an "abnormal" alarm and/or the stop of rotation of the screw shaft are (is) performed when an overload duration time ($t_o$) of maintaining the overload condition exceeds a set time ($t_s$). In this way the screw shaft is protected from fatigue fracture caused by application thereto of such a load as does not exceed a designed mechanical strength but causes fatigue fracture.

7 Claims, 11 Drawing Sheets

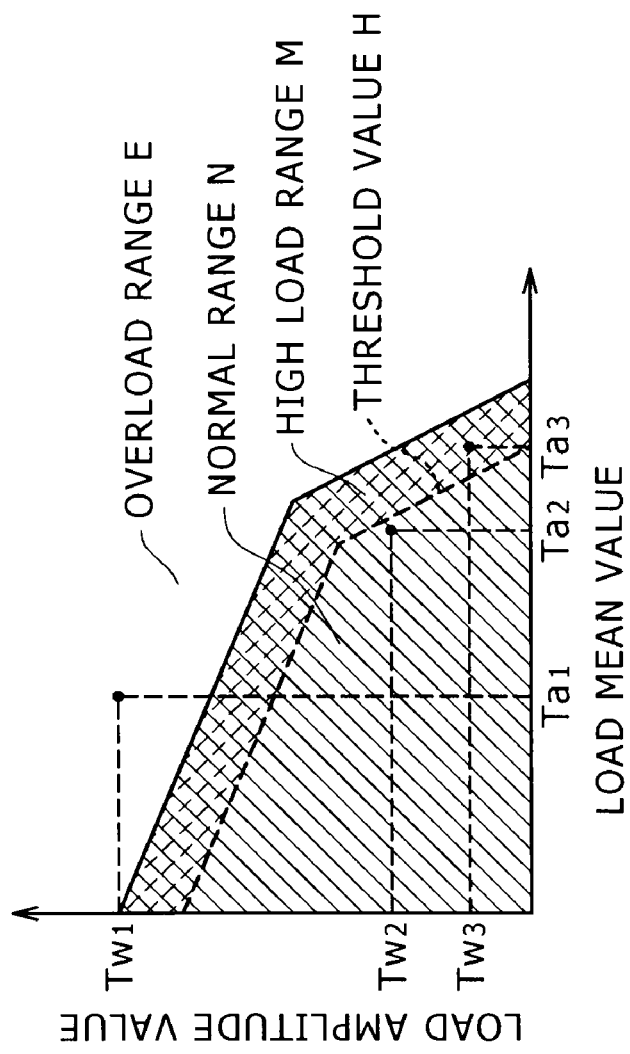
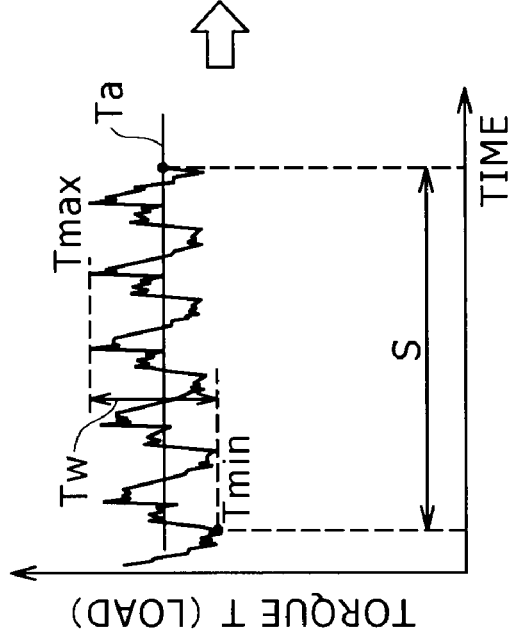
FIG. 3A
FIG. 3B

LOAD MONITORING METHOD AND LOAD MONITORING APPARATUS FOR KNEADING APPARATUS

BACKGROUND OF THE INVENTION

1. Field of the Invention

The present invention relates to a load monitoring method and a load monitoring apparatus for monitoring a load imposed on a screw shaft of a kneading apparatus such as an extruder or a kneader.

2. Description of the Related Art

A kneading apparatus such as a kneader or an extruder includes a barrel having a long hollow portion in its axial direction, a screw shaft for kneading a material to be kneaded which is fed into the barrel, and a drive unit for rotating the screw shaft. The screw shaft has kneading blades for kneading the material to be kneaded.

In kneading, if the material to be kneaded is not in a thoroughly melted state or is difficult to be kneaded, a load larger than a designed strength may be imposed on the screw shaft. In conventional kneading apparatus, a load monitoring apparatus is used lest a load larger than a designed strength should be imposed on the screw shaft.

For example, in Japanese Patent Laid-Open Publication No. 2000-225641 there is disclosed an extruder having a load monitoring apparatus. In the load monitoring apparatus of the extruder disclosed in the patent literature, the number of revolutions of a drive unit and that of a screw shaft are detected by a revolution sensor attached to the drive unit and a revolution sensor attached to the screw shaft, respectively, and the difference between both revolutions is grasped as a load, and the load is monitored so as not to exceed a mechanical strength designed for the screw shaft. This conventional extruder is provided with a screw shaft protecting mechanism. According to this screw shaft protecting mechanism, when a load larger than the designed strength is imposed on the screw shaft, the rotational speed of the screw shaft is decreased or the amount of a to-be-kneaded material fed is decreased, thereby protecting the screw shaft.

In the extruder of the Japanese patent laid-open publication 2000-225641, however, no consideration is given to the case where a repetitive load of a degree not exceeding the designed mechanical strength is imposed on the screw shaft and causes fatigue fracture of the shaft. Therefore, even if operation is continued in such a manner that the load does not exceed the designed mechanical strength of the screw shaft, there is a fear that the screw shaft may be fractured by fatigue fracture.

On the other hand, in the extruder of the Japanese patent laid-open publication 2000-225641, the screw shaft can be protected by controlling the load to a value smaller than the designed mechanical strength of the screw shaft. However, if an attempt is made to set a load at a very small load, it is required to decrease the rotational speed of the screw shaft or decrease the amount of the to-be-kneaded material fed, thus resulting in lowering of the working efficiency or increase of the controlling frequency for the rotational speed or the amount of the material to be fed and causing a great variation in the amount of the material fed. Thus, there is a fear of the productivity being deteriorated markedly.

SUMMARY OF THE INVENTION

The present invention has been accomplished in view of the above-mentioned problems and it is an object of the invention to provide a load monitoring method and a load monitoring apparatus for a kneading apparatus, capable of monitoring the load on a screw shaft lest a load which causes fatigue fracture of the screw shaft should be imposed on the screw shaft over a certain period of time or more and thereby capable of protecting the screw shaft from fatigue fracture, in the case where a load not exceeding a designed mechanical strength is imposed cumulatively on the screw shaft.

For achieving the above-mentioned object, the load monitoring method for a kneading apparatus according to the present invention adopts the following technical means.

The load monitoring method according to the present invention is for a kneading apparatus including a screw shaft, the screw shaft having an input shaft portion to which is transmitted power from a motor and being adapted to knead a material to be kneaded, the load monitoring method comprising:

detecting loads on the input shaft portion of the screw shaft by a load detector provided in the input shaft portion;

averaging the detected loads over a predetermined time section to obtain a load mean value and calculating a difference between a maximum value and a minimum value of the loads in the time section to determine a load amplitude value;

determining that the load on the screw shaft is in a normal condition when the thus-determined load mean value and load amplitude value lie within a predetermined normal range, or determining that the load on the screw shaft is in an overload condition when the thus-determined load mean value and load amplitude value do not lie within the predetermined normal range;

in case of the load on the screw shaft being in the overload condition, integrating the time of maintaining the overload condition as an overload duration time;

in case of the load on the screw shaft being in the normal condition, resetting the overload duration time; and when the overload duration time exceeds a set time, performing at least one of issuance of an "abnormal" alarm and stop of rotation of the screw shaft.

According to this method, in the case where repetitive loads of a degree not exceeding a mechanical strength designed for the screw shaft are applied cumulatively to the screw shaft, it is possible to make monitoring lest an overload should be imposed on the screw shaft over a certain period of time which would cause growing of a very fine crack acting as a start point of fatigue fracture, and hence possible to protect the screw shaft from fatigue fracture.

Preferably, in connection with the issuance of the "abnormal" alarm and the stop of rotation of the screw shaft, a second set time shorter than the set time and set within one minute is newly provided and the "abnormal" alarm is issued upon lapse of the second set time, thereafter, the rotation of the screw shaft is stopped upon lapse of the set time.

By so doing, the issuance of "abnormal" alarm and the stop of rotation of the screw shaft can be done while shifting time and it is possible to announce by the "abnormal" alarm that the load on the screw shaft is in an overload condition, prior to the stop of rotation of the screw shaft.

In the load monitoring method it is preferable that at least one of the issuance of the "abnormal" alarm and the stop of rotation of the screw shaft be done when the detected load exceeds a predetermined abnormal value.

By so doing, the screw shaft can be protected not only from fatigue fracture thereof but also from fracture thereof caused by a load exceeding the designed mechanical strength.

In the load monitoring method, the load mean value may be given as a fixed value instead of averaging the detected loads over a predetermined time section to obtain a load mean value.

By so doing, by only monitoring the load amplitude value it is possible to determine whether the load imposed on the screw will cause fatigue fracture and thus the load on the screw shaft can be monitored in a simpler manner.

The load monitoring method described above may be modified as follows.

A load monitoring method for a kneading apparatus including a screw shaft, the screw shaft having an input shaft portion to which is transmitted power from a motor and being adapted to knead a material to be kneaded, the load monitoring method comprising:

detecting loads on the input shaft portion of the screw shaft by a load detector provided in the input shaft portion;

averaging the detected loads over a predetermined time section to obtain a load mean value and calculating a difference between a maximum value and a minimum value of the loads in the time section to determine a load amplitude value;

determining that the load on the screw shaft is in a high load condition when the load mean value and load amplitude value thus obtained exceed a threshold value of a high load region lying in a predetermined normal range;

in case of the load on the screw shaft being in the high load condition, integrating the time of maintaining the high load condition as a cumulative high load time; and when the cumulative high load time exceeds a predetermined time, determining that the screw shaft has reached a timing for maintenance and issuing an alarm.

By so doing, because it is possible to know accurately the cumulative load quantity which the screw shaft receives, it is possible to carry out the maintenance more effectively than the maintenance based on the operation time.

For achieving the above-mentioned object, the load monitoring apparatus for a kneading apparatus according to the present invention adopts the following technical means.

The load monitoring apparatus according to the present invention is for a kneading apparatus including a screw shaft, the screw shaft having an input shaft portion to which is transmitted power from a motor and being adapted to knead a material to be kneaded, the load monitoring apparatus comprising:

a load detector provided in the input shaft portion of the screw shaft to detect loads on the input shaft portion;

a characteristic extracting section adapted to average the loads detected by the load detector over a predetermined time section to obtain a load mean value and calculate a difference between a maximum value and a minimum value of the loads in the time section to determine a load amplitude value;

a determining section adapted to determine that the load on the screw shaft is in a normal condition when the load mean value and load amplitude value obtained by the characteristic extracting section are within a predetermined normal range, or determine that the load on the screw shaft is in an overload condition when the load mean value and the load amplitude value are not within the normal range;

a time integrating section adapted to integrate an overload duration time indicative of the time of maintaining the overload condition when the load on the screw shaft is determined to be in the overload condition by the determining section;

a reset section adapted to reset the overload duration time when the load on the screw shaft is determined to be in the normal condition by the determining section; and a protecting section adapted to perform at least one of issuance of an "abnormal" alarm and stop of rotation of the screw shaft when the overload duration time exceeds a preset time.

By so doing, when a repetitive load of a degree not exceeding a designed mechanical strength of the screw shaft is imposed on the screw shaft cumulatively, it is possible to make monitoring lest an overload should be applied to the screw shaft over a certain period of time or longer which would cause growing of a fine crack as a starting point of fatigue fracture. Thus, it is possible to protect the screw shaft from fatigue fracture.

Further, the load monitoring apparatus according to the present invention is for a kneading apparatus including a screw shaft, the screw shaft having an input shaft portion to which is transmitted power from a motor and being adapted to knead a material to be kneaded, the load monitoring apparatus comprising:

a load detector provided in the input shaft portion of the screw shaft to detect loads on the input shaft portion;

a characteristic extracting section adapted to average the loads detected by the load detector over a predetermined time section to obtain a load mean value and calculate a difference between a maximum value and a minimum value of the loads in the time section to determine a load amplitude value;

a determining section adapted to determine that the load on the screw shaft is in a high load condition when the load mean value and load amplitude value obtained by the characteristic extracting section exceed a threshold value of a high load region lying in a predetermined normal range;

a time integrating section adapted to integrate a cumulative high load time indicative of the time of maintaining the high load condition when the load on the screw shaft is determined to be in the high load condition by the determining section; and a protecting section adapted to announce by an alarm that the screw shaft has reached a timing for maintenance when the cumulative high load time exceeds a predetermined time.

By so doing, because it is possible to know accurately the cumulative load quantity which the screw shaft receives, it is possible to carry out the maintenance more effectively than the maintenance based on the operation time.

By the load monitoring method and apparatus of the present invention it is possible to protect the screw shaft from fatigue fracture.

BRIEF DESCRIPTION OF THE DRAWINGS

FIG. 3 is an explanatory diagram showing a mechanism for determining an overload condition of a screw shaft from detected loads;

DETAILED DESCRIPTION OF THE PREFERRED EMBODIMENTS

The load monitoring method and load monitoring apparatus for a kneading apparatus according to the present invention will be described hereinunder by way of embodiments thereof and with reference to the accompanying drawings.

Figure 1:
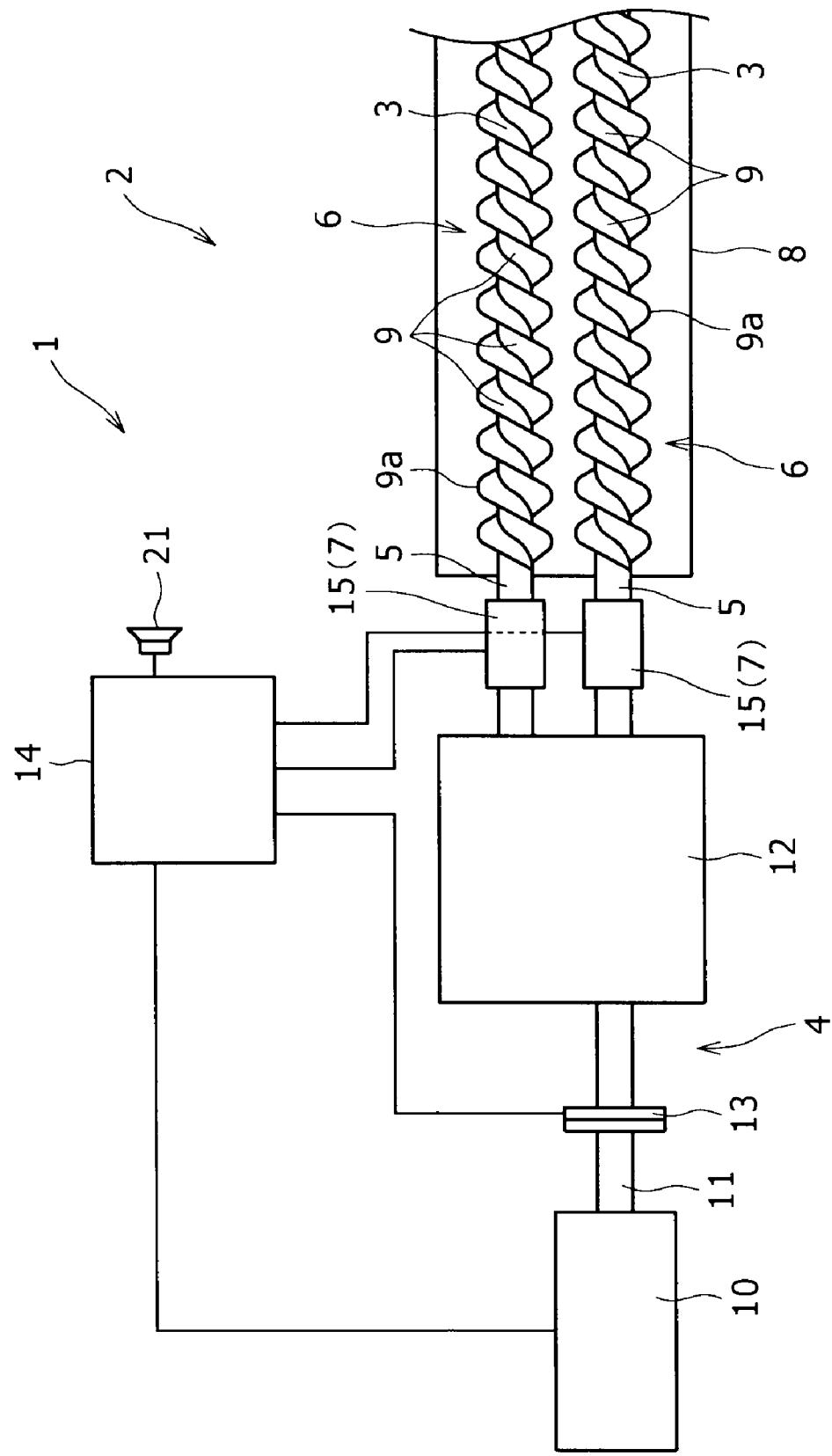
FIG. 1 is a plan view of an extruder equipped with a load monitoring apparatus according to the present invention.

FIG. 1 schematically illustrates an extruder 2 (a kneading apparatus) equipped with a load monitoring apparatus 1 according to a first embodiment of the present invention.

The construction of the extruder 2 will be described below in detail. For the convenience of explanation it is assumed that in FIG. 1 the left side is an upstream side and the right side is a downstream side.

The extruder 2 has a pair of right and left screw shafts 3 and a drive mechanism 4 for rotating the screw shafts 3 is connected to the extruder 2.

The screw shafts 3 have input shaft portions 5 on the upstream side and kneading sections 6 for kneading a material to be kneaded on the downstream side with respect to the input shaft portions 5. The screw shafts 3 are inserted into a barrel 8 the interior of which is hollowed out in a glasses hole shape.

The input shaft portions 5 transmit power of the drive mechanism 4 to be described later to the kneading sections 6 and load detectors 7 are mounted on outer periphery surfaces of the input shaft portions 5.

The kneading sections 6 have kneading segments (not shown) and feed segments 9. As the kneading segments there are used, for example, rotary segments or kneading disc segments. The feed segments 9 are each provided with one or plural feed flights $9a$ twisted spirally in the axial direction of the screw shafts to feed the material to be kneaded from the upstream side toward the downstream side.

Therefore, when the screw shafts 3 are rotated, the to-be-kneaded material heated in a melted or half-melted state is fed from the upstream side toward the downstream side while being kneaded.

The drive mechanism 4 includes a motor 10 for generating power, a drive shaft 11 which is rotated by the motor 10, and a gear box 12 for conversion and transfer of the rotation of the drive shaft 11 to induce rotation of the pair of screw shafts 3, 3.

The drive shaft 11 is rotated by the motor 10 and transmits power generated in the motor 10 to the gear box 12. On an intermediate side of the drive shaft 11 there is mounted a coupling device 13 capable of cutting off the transfer of power. In this embodiment the coupling device 13 is constituted by an air clutch, however it may be constituted for example by an electromagnetic clutch.

The gear box 12 reduces the rotational speed of at least the drive shaft 11 and transmits power to the extruder side. A function of distributing the power to the right and left screw shafts 3 or shifting the rotational speed may be added integrally with or separately from the gear box 12.

The load detectors 7 are provided in the input shaft portions 5 of the right and left screw shafts 3, respectively, to detect loads on the input shaft portions 5. In this first embodiment, torque T, which is detected by each of torque meters 15 (load detectors 7), is used as the load. As each of the torque meters 15 there may be used, for example, an optical or electromagnetic type torque meter or a torque meter which utilizes a strain gauge.

The load monitoring apparatus 1 according to this first embodiment has coupling type torque meters 15 and a controller 14.

Figure 2:
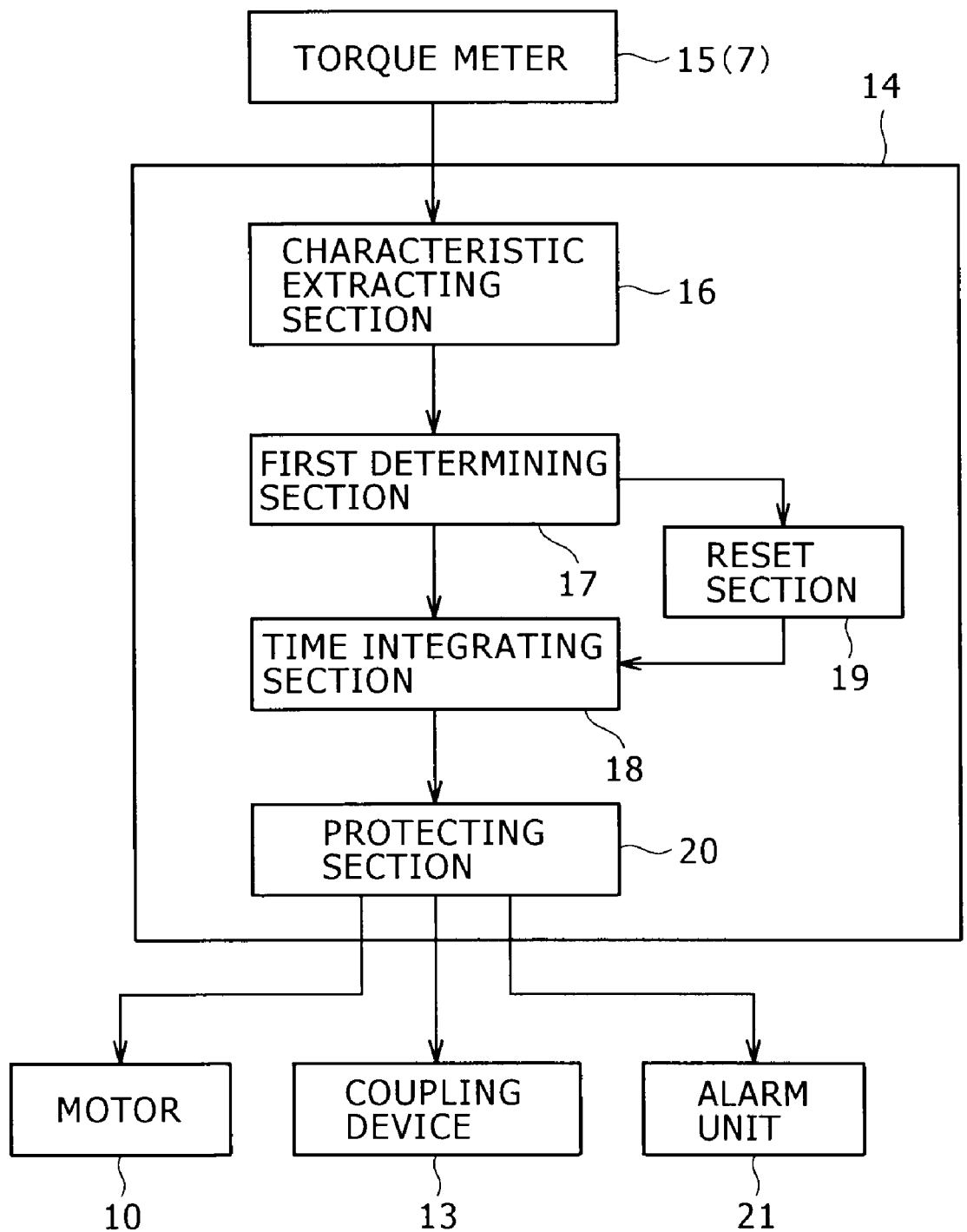
FIG. 2 is an explanatory diagram showing the structure of a controller.

As shown in FIG. 2, the controller 14 includes a characteristic extracting section 16 which not only averages detected values of torque T over a predetermined time section S to determine a load mean value Ta but also calculates a difference between a maximum value Tmax and a minimum value Tmin of the detected values of torque T detected in the time section S to determine a load amplitude value Tw, and a first determining section 17 (determining section) which determines that the load on the screw shaft concerned is in a normal condition when the thus-determined load mean value Ta and load amplitude value Tw lie within a normal range N predetermined in accordance with a fatigue evaluation diagram and which further determines that the load on the screw shaft concerned is in an overload condition when the thus-determined load mean value Ta and load amplitude value Tw are not within the normal range N.

The controller 14 further includes a time integrating section 18 which integrates an overload duration time t0 indicative of the time of maintaining an overload condition when the detected torque T is in an overload condition, a reset section 19 which resets the overload duration time t0 when the detected torque T is in a normal condition, and a protecting section 20 which issues an "abnormal" alarm 22 from an alarm unit 21 and stops the rotation of the screw shafts 3 when the overload duration time t0 exceeds a set time.

More specifically, the controller 14 is constituted by a computer or a sequencer.

The characteristic extracting section 16 determines the load mean value Ta and the load amplitude value Tw on the basis of both detected values of torque T detected by each torque meter 15 and a pre-inputted time section S, then outputs the thus-determined load mean value Ta and load amplitude value Tw to a first determining section 17. The characteristic extracting section 16 performs this operation repeatedly.

As shown in FIG. 3($a$), the load mean value Ta is obtained by averaging the detected values of torque T in the time section S, while the load amplitude value Tw is obtained by calculating a difference between the maximum value Tmax and the minimum value Tmin of the detected values of torque T in the time section S.

The time section S can be set appropriately by input in the range of about several seconds to ten-odd seconds, taking into account the time permitting omission of an instantaneous overload which can occur by accident.

On the basis of the load mean value Ta and load amplitude value Tw provided from the characteristic extracting section 16 the first determining section 17 determines whether the screw shaft 3 concerned is in a normal condition free from the fear of fatigue fracture thereof or is in an overload condition involving the fear of such fatigue fracture, then outputs a determination result to the effect of the screw shaft being in the normal condition to the reset section 19 or outputs a determination result to the effect of the screw shaft being in the overload condition to the time integrating section 18.

Distinction between the normal condition and the overload condition is made on the basis of whether the load mean value Ta and the load amplitude value Tw are within the normal range N in the fatigue evaluation diagram. The fatigue evaluation diagram shows as the normal range N the range of the load mean value Ta and the load amplitude value Tw in which the screw shaft 3 does not induce fatigue fracture in design.

As shown in FIG. 3($b$), for example, when the load mean value is Ta2 and the load amplitude value is Tw2, falling under the normal range N in the fatigue evaluation diagram, it is determined that the screw shaft 3 concerned is in the normal condition, while when the load mean value is Ta1 and the load amplitude value is Tw1, not falling under the normal range N (falling under an overload range E), it is determined that the screw shaft 3 is in the overload condition.

The time integrating section 18 integrates the overload duration time t0 indicative of the time of maintaining the overload condition on the basis of the determination result which the screw shaft 3 is in the overload condition, and outputs the integrated overload duration time t0 to the protecting portion 20.

On the basis of the determination result that the screw shaft is in the normal condition the reset section 19 resets the overload duration time t0 to zero.

When the inputted overload duration time t0 exceeds a set time ts, the protecting section 20 issues the "abnormal" alarm 22 and/or stops rotation of the screw shaft 3.

The set time ts is a time long enough to determine that the overload condition is not accidental abnormality and it is in the range of about several ten seconds to several minutes, which can be set suitably by input. However, if the time in question is set as long as 30 minutes or longer, then in the event there exists a fine crack as a starting point of fatigue fracture, the fine crack will grow and it will become easier for fatigue fracture to occur. Therefore, it is necessary to avoid such a long time setting.

The "abnormal" alarm 22 is issued from the alarm unit 21. Stop of rotation of the screw shafts 3 is done by cutting off the power of the drive shaft 11 through the coupling device 13 which can contact and break in accordance with an electric signal and/or turning OFF the motor 10. It is optional whether one of issuance of the "abnormal" alarm 22 and stop of rotation of the screw shafts 3 should be done, or both.

Figure 4:
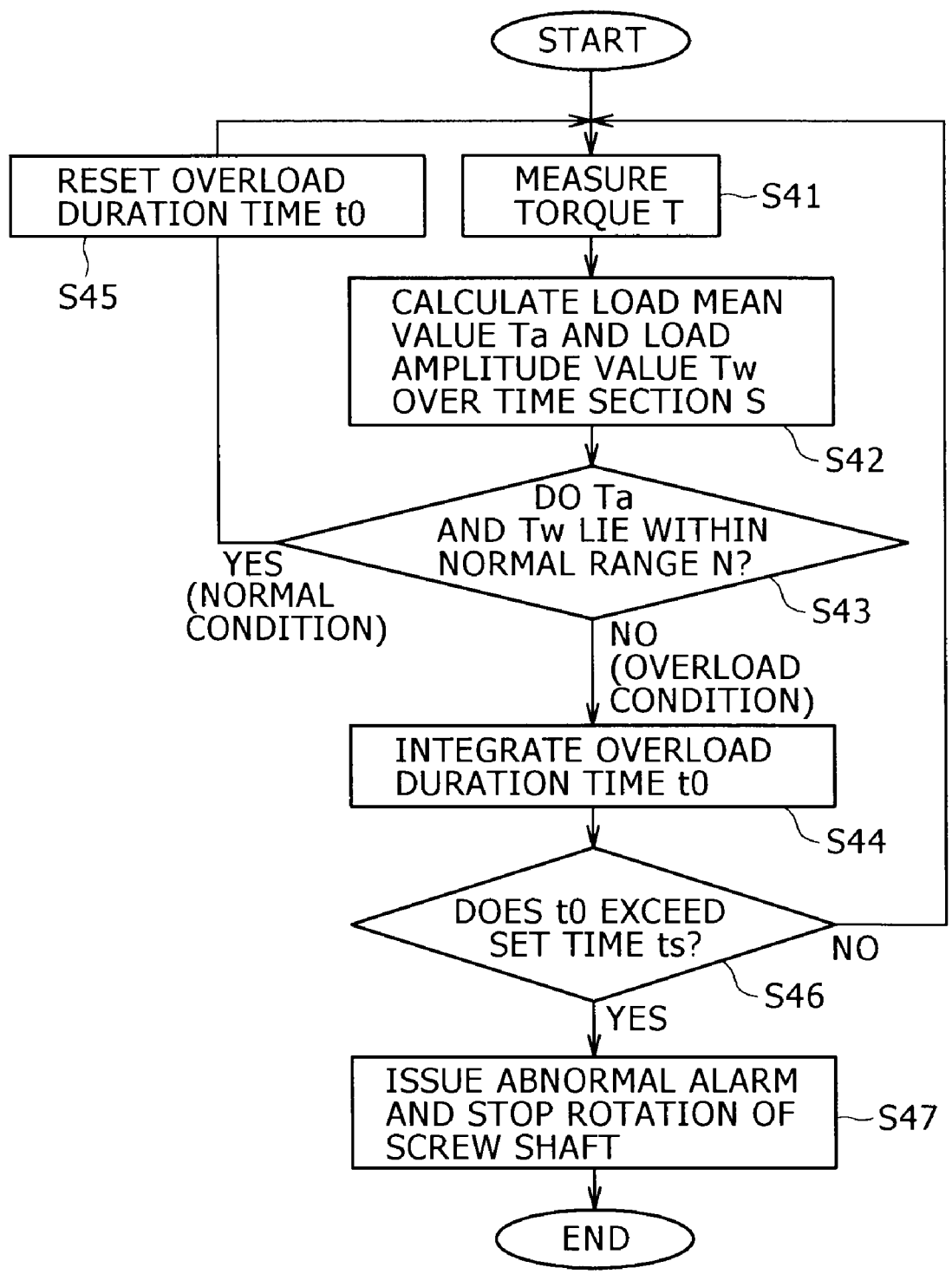
FIG. 4 is a flow chart showing a load monitoring method according to a first embodiment of the present invention.

With reference to FIG. 4, a description will be given below about the load monitoring method according to this first embodiment, more specifically, about the flow of signals in the controller 14.

The load monitoring method according to this first embodiment is carried out in accordance with steps S41 to S47.

First, when feeding the material to be kneaded from the upstream side toward the downstream side while kneading it by the screw shafts 3, there are detected values of torque T on the screw shafts 3 by means of the torque meters 15 mounted on the input shaft portions 5 [S41]

Next, a load mean value Ta and a load amplitude value Tw are calculated on the basis of the detected values of torque T. That is, the detected values of torque T are averaged over a predetermined time section S to obtain a load mean value Ta and a difference between a maximum value Tmax and a minimum value Tmin of the torque values in the time section S is calculated to obtain a load amplitude value Tw [S42].

It is determined whether the load mean value Ta and load amplitude value Tw thus obtained lie within a normal range N. The normal range N is a range of the load mean value Ta and the load amplitude value Tw in which the screw shafts 3 do not cause fatigue fracture in design.

When the load mean value Ta and the load amplitude value Tw do not lie within the normal range N, it is determined that the screw shaft concerned is in an overload condition, while when both values Ta and Tw lie within the normal range N, it is determined that the screw shaft is in a normal condition [S43].

When it is determined that the detected values of torque T correspond to the overload condition, the time of maintaining the overload condition is integrated as an overload duration time t0 [S44].

When it is determined that the detected values of torque T correspond to the normal condition, the overload duration time t0 is reset to zero [S45].

It is determined whether the overload duration time t0 has exceeded the set time ts [S46].

When the overload duration time t0 has exceeded the set time ts, the "abnormal" alarm 22 is issued from the alarm unit 21 or the rotation of the screw shaft 3 is stopped [S47]. If the overload duration time t0 does not exceed the set time ts, the processing flow returns to S41.

It is optional whether it is one or both of issuance of the "abnormal" alarm 22 and stop of rotation of the screw shafts 3 that should be done.

By the load monitoring apparatus and load monitoring method according to the present invention it is possible to make monitoring lest an overload (torque T) should be imposed on the screw shafts 3 over a certain time or longer so as to prevent a fine crack from growing under the application of the overload, the fine crack being a starting point of fatigue fracture that can occur with a repetitive load of a degree not exceeding a designed mechanical strength. Thus, the screw shafts 3 can be protected from fatigue fracture.

Moreover, in the load monitoring apparatus and load monitoring method according to the present invention, protection of the screw shafts 3 is started when the load mean value Ta continues to be applied to the screw shafts 3 over a certain time or longer. Thus, it is possible to prevent the rotation of the screw shafts 3 from being stopped by a temporary (accidental) load which would cause a lowering of the working efficiency or a great variation in the amount of the material supplied.

Second Embodiment

A load monitoring method and a load monitoring apparatus according to a second embodiment of the present invention will be described below.

Figure 5:
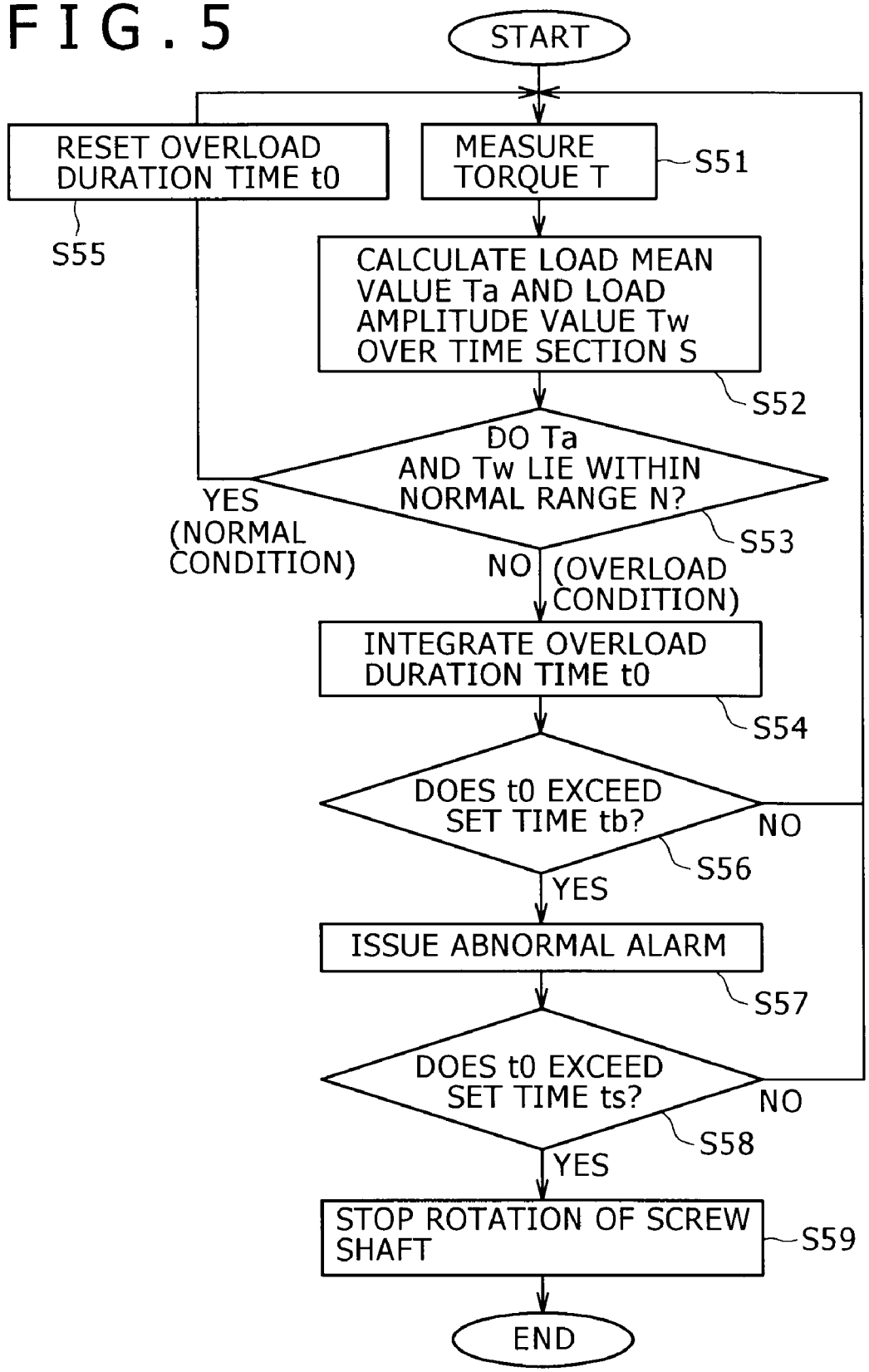
FIG. 5 is a flow chart showing a load monitoring method according to a second embodiment of the present invention.

As shown in FIG. 5, the load monitoring method according to this second embodiment is different from the first embodiment in that in connection with performing both issuance of the "abnormal" alarm 22 and stop of rotation of the screw shafts 3, there newly is provided a second set time tb shorter than the set time ts and set within one minute, the "abnormal" alarm 22 is issued when the overload duration time t0 exceeds the second set time tb, and thereafter, when the overload duration time t0 exceeds the set time ts, the rotation of the screw shafts 3 is stopped.

The load monitoring method according to this second embodiment is carried out in accordance with steps S51 to S59. In this case, the steps S51 to S55 are carried out in the same way as in the steps S41 to S45 in the first embodiment. But the step S56 and subsequent steps are different from the first embodiment.

First, in the load monitoring method according to this second embodiment there is used the second set time tb other than the set time ts. From the standpoint of preventing the growth of a fine crack as a starting point of fatigue fracture so that the continuous overload condition does not fracture the screw shafts 3, the second set time tb is set to a time within one minute and shorter than the set time ts. Then, it is determined whether the overload duration time t0 has exceeded the second set time tb [S56].

When the overload duration time t has exceeded the second set time tb, the "abnormal" alarm 22 is issued from the alarm unit 21 [S57], while if the overload duration time t0 does not exceed the second set time tb, the processing flow returns to S51.

After issuance of the "abnormal" alarm 22, it is determined whether the overload duration time t0 has exceeded the set time ts [S58].

When the overload duration time t0 has exceeded the set time ts, the rotation of the screw shafts 3 is stopped [S59], while if the overload duration time t0 does not exceed the set time ts, the processing flow returns to S51.

As in this second embodiment the issuance of the "abnormal" alarm and the stop of rotation of the screw shafts 3 are performed while shifting time (the "abnormal" alarm is issued before stopping the rotation of the screw shafts 3), whereby it is possible to become aware of the abnormal condition before the screw shafts 3 stop rotation. As a result, the screw shafts 3 can be brought to a normal operating condition before stopping the rotation thereof and thus, in a continued state of the kneading operation, it is possible to prevent the screw shafts 3 from assuming an overload condition.

Other constructional points, as well as function and effect, in the load monitoring method and load monitoring apparatus according to this second embodiment are the same as in the first embodiment.

Third Embodiment

A load monitoring method and a load monitoring apparatus according to a third embodiment of the present invention will be described below.

Figure 6:
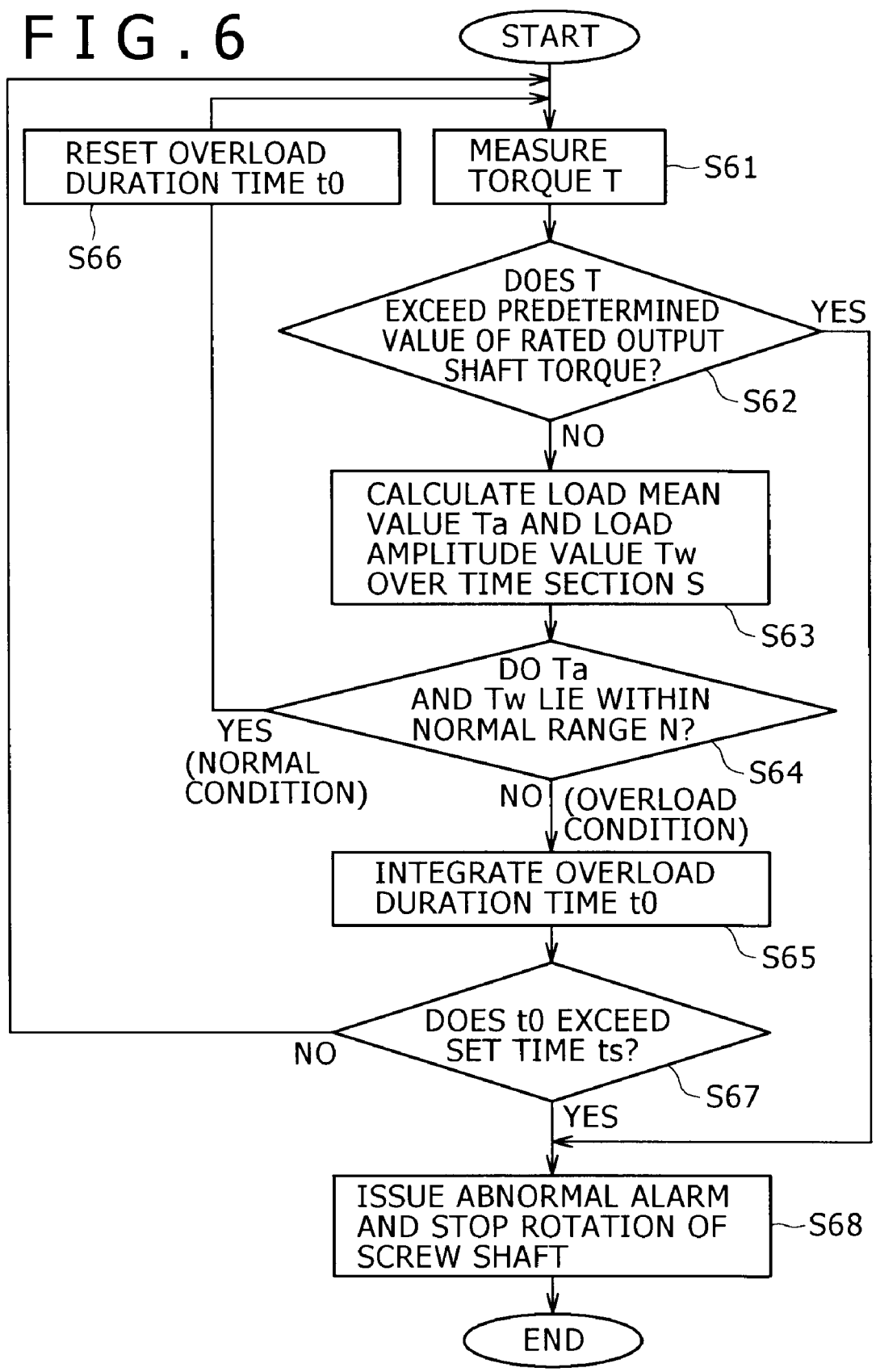
FIG. 6 is a flow chart showing a load monitoring method according to a third embodiment of the present invention.
Figure 9:
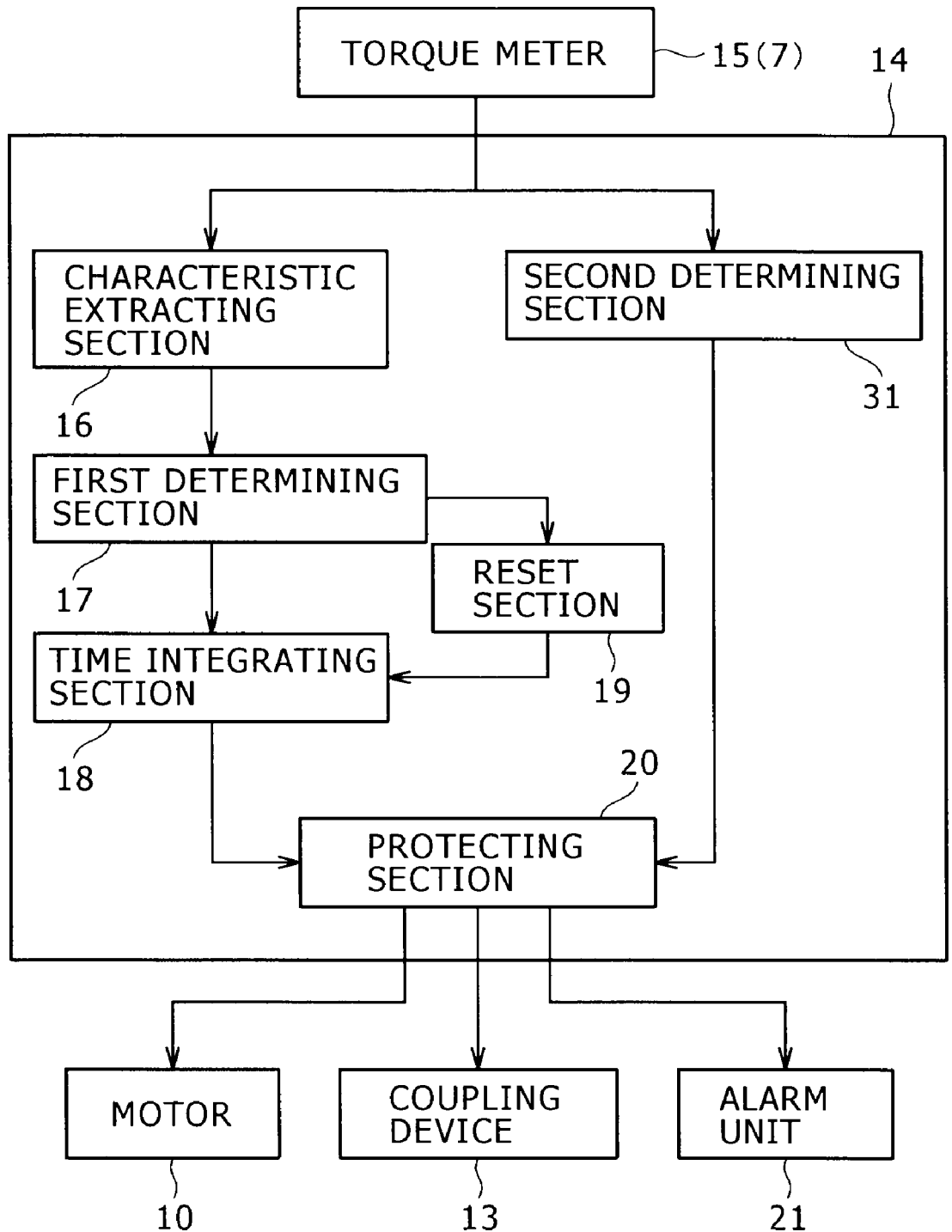
FIG. 9 is an explanatory diagram showing the structure of a controller used in the third embodiment.

As shown in FIG. 6, the load monitoring method according to this third embodiment is different from the first embodiment in that the issuance of the "abnormal" alarm 22 and/or the stop of rotation of the screw shafts 3 are (is) performed when the detected value of torque T exceeds a predetermined abnormal value. In a controller 14 according to this third embodiment, as shown in FIG. 9, there is accordingly provided a second determining section 31 which determines whether the detected value of torque T has exceeded a predetermined abnormal value.

More particularly, the second determining section 31 in the controller 14 according to this third embodiment determines whether the detected value of torque T corresponds to a mechanical strength designed for the screw shafts 3 or more. A signal indicating a determination result of the torque T being larger than the abnormal value is outputted to the protecting section 20.

The abnormal value may be set in accordance with a designed mechanical strength which is determined from a calculated mechanical strength limit taking a safety factor into account. For example, an allowable limit torque of each screw shaft 3 may be made a reference value. In making determination in the controller 14, the abnormal value may be substituted by an output shaft torque generated on each output shaft of the gear box 12 while the motor 10 is in operation at a rated torque. In this case, the abnormal value is set to a predetermined value in the range of 110% to 130% with respect to a rated output shaft torque and in this embodiment it is set to 110% of the rated output shaft torque.

As shown in FIG. 6, the load monitoring method according to this third embodiment is carried out in accordance with steps S61 to S68.

First, the torque T is detected by each torque meter 15 [S61].

Next, it is determined whether the value of torque T inputted from the torque meter 15 is larger or not than the abnormal value (110% of the rated output shaft torque) [S62].

When the detected value of torque T is smaller than the abnormal value, a load mean value Ta and a load amplitude value Tw are determined in the first determining section 17 on the basis of the torque T [S63]. The steps from S64 to S67 are the same as the steps S43 to S46 in the first embodiment.

When the detected value of torque T is larger than the abnormal value, it is determined that the torque T (load) exceeding the designed mechanical strength is imposed on the screw shaft 3 concerned, then the "abnormal" alarm 22 is issued and, if necessary, the rotation of the screw shaft 3 is stopped [S68].

By determining whether the detected load (torque) corresponds to the designed mechanical strength or more of the screw shaft 3 concerned it is possible to protect the screw shaft not only from fatigue fracture but also from a fracture owing to a load exceeding the designed mechanical strength.

Other constructional points, as well as function and effect, of the load monitoring apparatus and load monitoring method according to this third embodiment are the same as in the first embodiment.

Fourth Embodiment

A load monitoring method and a load monitoring apparatus according to a fourth embodiment of the present invention will be described below.

Figure 7:
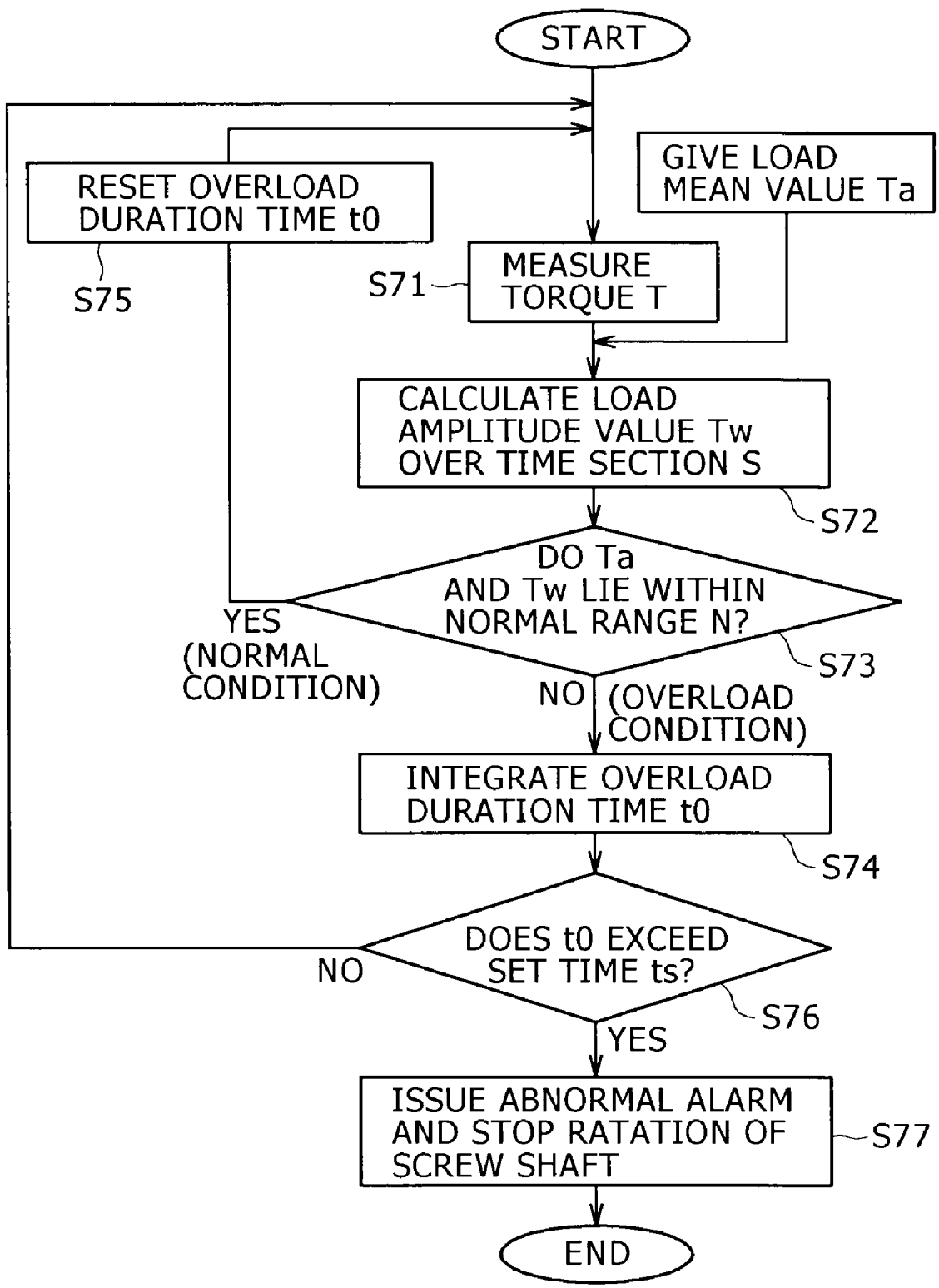
FIG. 7 is a flow chart showing a load monitoring method according to a fourth embodiment of the present invention.
Figure 10:
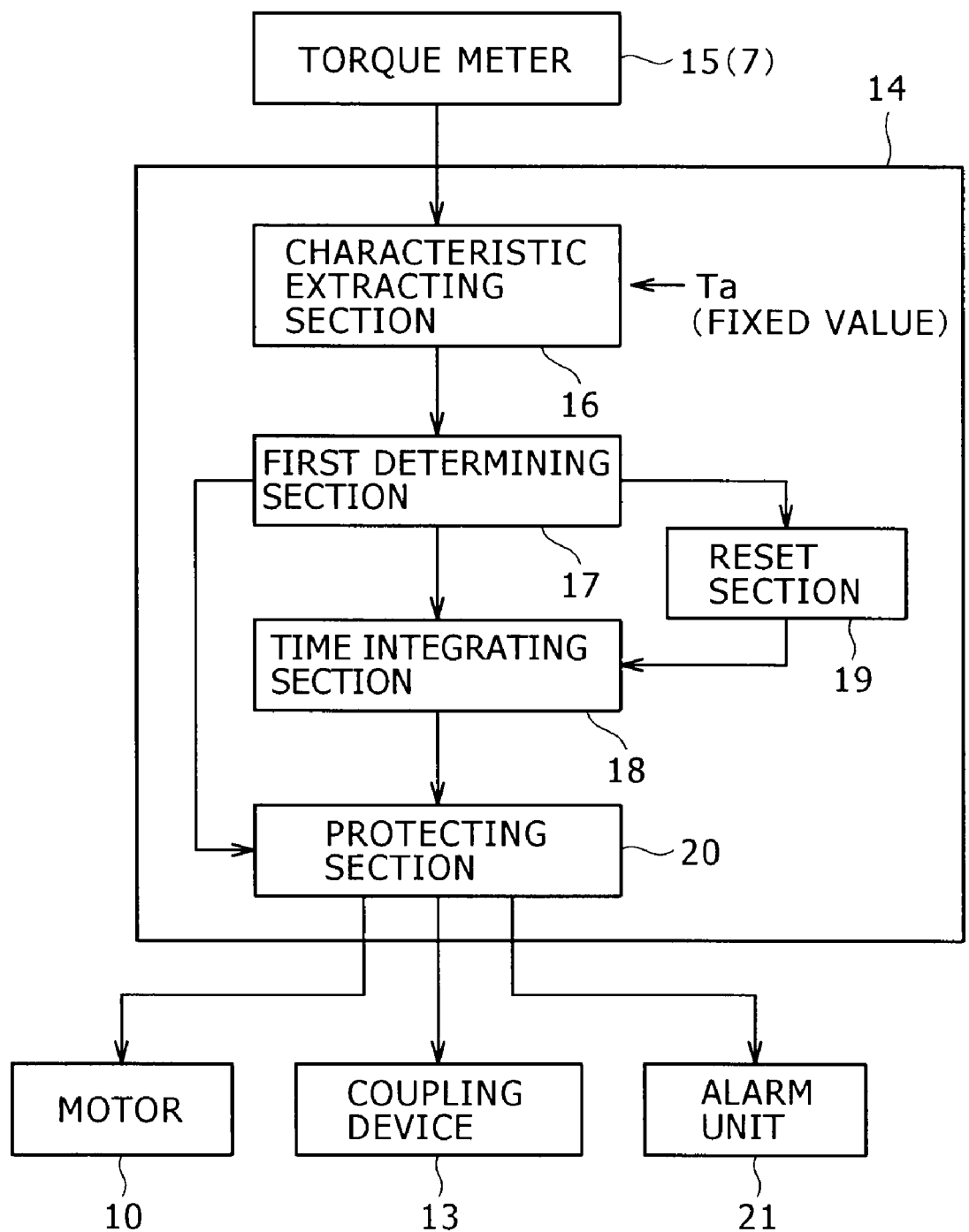
FIG. 10 is an explanatory diagram showing the structure of a controller used in the fourth embodiment.

As shown in FIG. 7, the load monitoring method according to this fourth embodiment is different from the first embodiment in that a load mean value Ta is given beforehand as a fixed value instead of averaging detected values of torque T over the predetermined time section S to determine a load mean value Ta. Therefore, in the load monitoring apparatus according to this fourth embodiment there is used a fixed value inputted beforehand to the load mean value Ta as in FIG. 10.

The load monitoring method according to this fourth embodiment is carried out in accordance with the steps S71 to S77.

First, in each torque meter 15 there are detected values of torque T in the same way as in S41 in the first embodiment [S71].

Next, a load amplitude value Tw is calculated on the basis of the detected values of torque T inputted from the torque meter 15 [S72]. At this time, the load mean value Ta is given as a fixed value. As the load mean value Ta given as a fixed value there may be used, for example, a load mean value so far obtained under the same kneading conditions.

In the first determining section 17 it is determined whether the torque T is in an overload condition or a normal condition, on the basis of the load amplitude value Tw obtained and the load mean value Ta given as a fixed value [S73]. The steps from S73 to S77 are the same as the steps S43 to S47 in the first embodiment.

In the load monitoring method according to this fourth embodiment, all that is required is only monitoring the load amplitude value Tw in the characteristic extracting section 16 and thus the construction of the characteristic extracting section 16 can be made simpler than in case of determining the load means value Ta.

Further, also in the first determining section 17, since both load mean value Ta and time section S are given as fixed values, it is possible to determine, by merely monitoring the load amplitude value Tw, whether the load on each screw shaft 3 is in an overload condition which will cause fatigue fracture. Thus, the load on each screw 3 can be monitored in a simpler manner.

Other constructional points, as well as function and effect, of the load monitoring method and load monitoring apparatus according to this fourth embodiment are the same as in the first embodiment.

Fifth Embodiment

Figure 8:
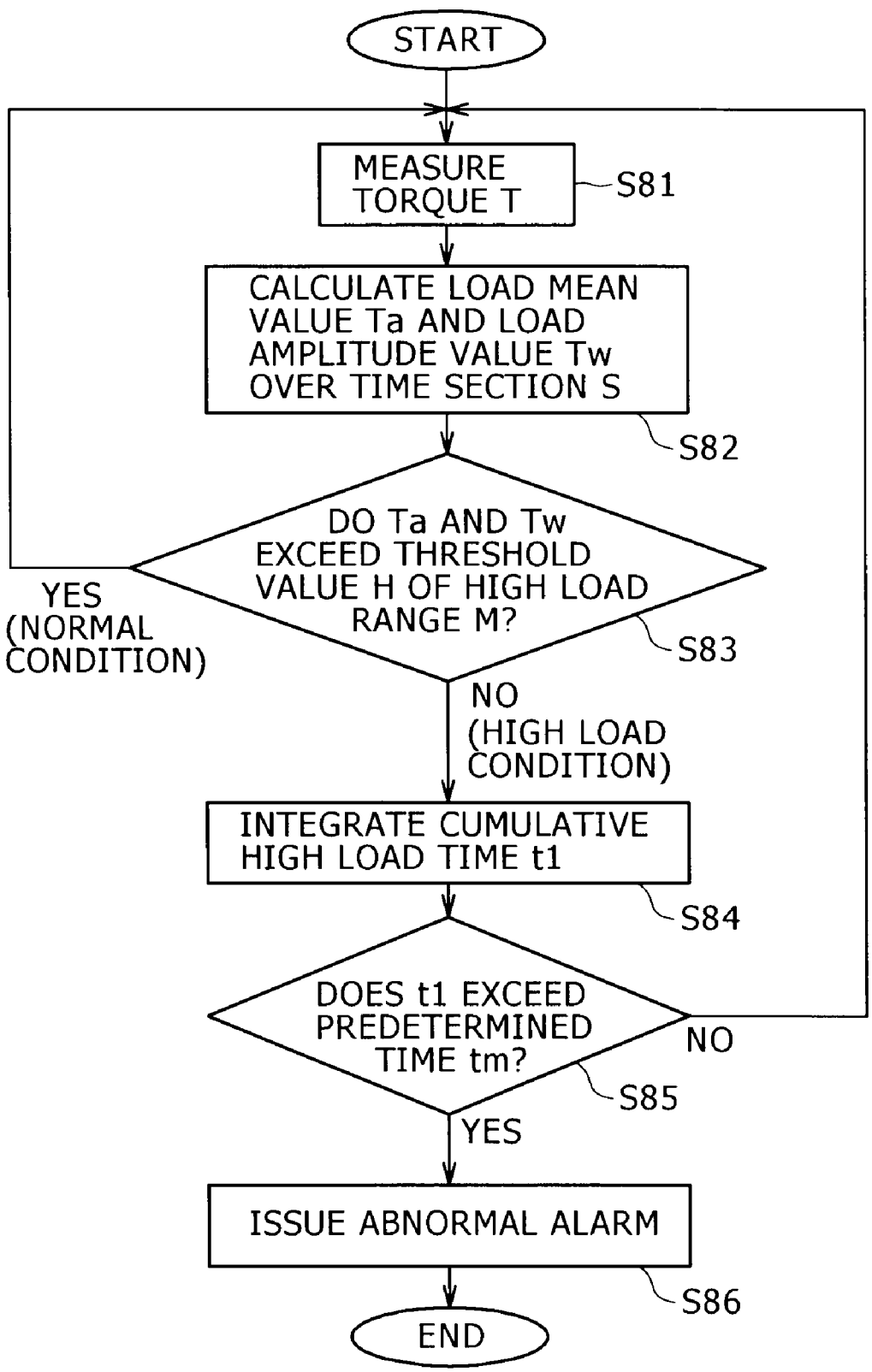
FIG. 8 is a flow chart showing a load monitoring method according to a fifth embodiment of the present invention.

A load monitoring method and a load monitoring apparatus according to this fifth embodiment will now be described. As shown in FIG. 8, the load monitoring method according to this fifth embodiment is different in the following point from the first embodiment. When both load mean value Ta and load amplitude value Tw obtained exceed a threshold value H of a high load range M lying in a normal range N which has been determined beforehand in correspondence to a fatigue evaluation diagram, it is determined that the load on the screw shaft concerned is in a high load condition, then the time of maintaining the high load condition is integrated as a cumulative high load time t1 with a time integrating section 18, and when the cumulative high load time t1 exceeds a predetermined time tm, it is determined that the screw shafts 3 have reached the timing for maintenance, whereupon the "abnormal" alarm 22 is issued.

Figure 11:
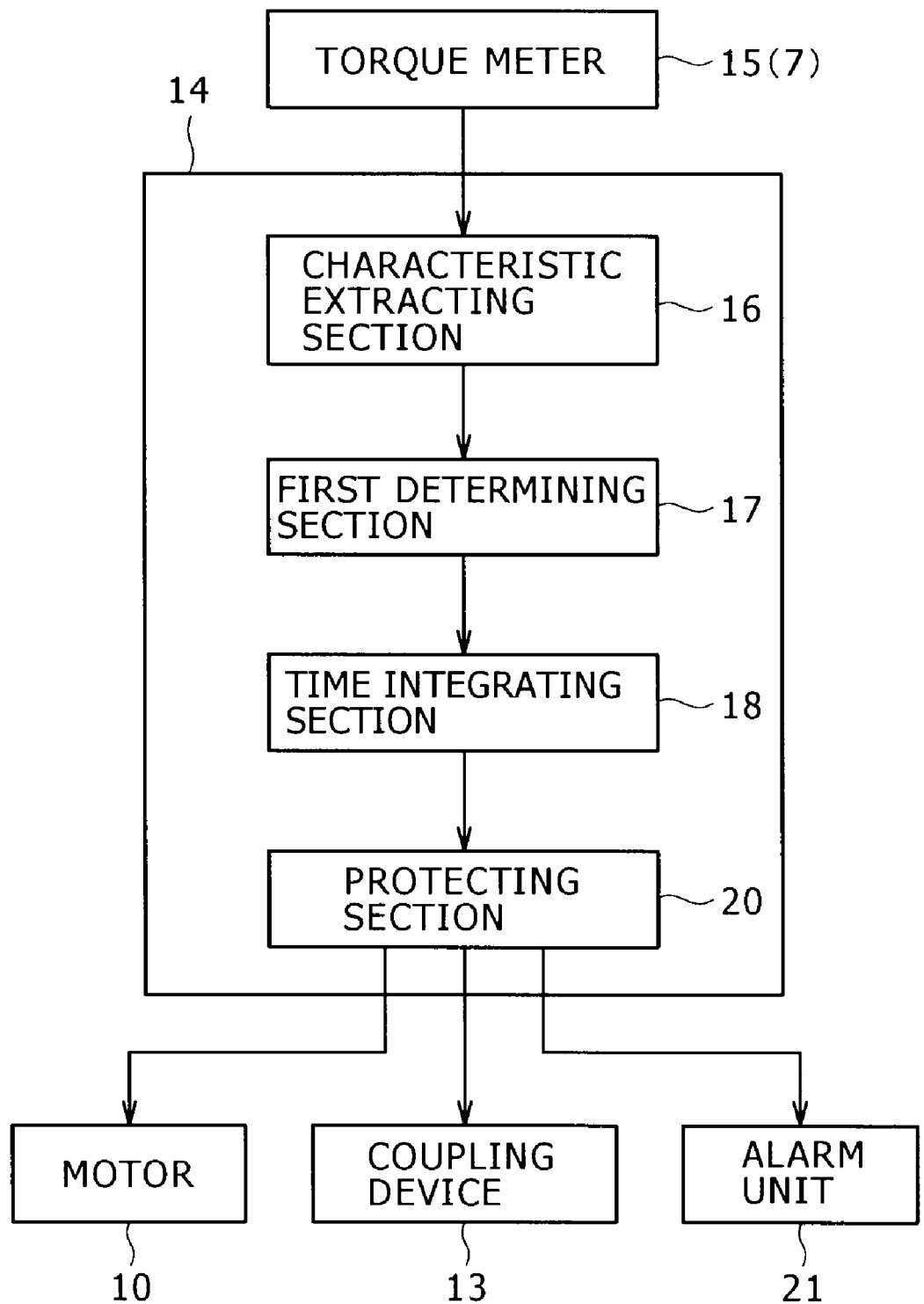
FIG. 11 is an explanatory diagram showing the structure of a controller used in the fifth embodiment.

As shown in FIG. 11, the load monitoring apparatus 1 according to this fifth embodiment includes the following sections and is different in this point from the first embodiment: a first determining section 17 which determines whether the screw shafts 3 are in a high load condition, the time integrating section 18 which integrates the time of maintaining the high load condition as a cumulative high load time t1, and a protecting section 20 which determines whether the cumulative high load time t1 exceeds a predetermined time tm and which, if the answer is affirmative, announces by an alarm ("abnormal" alarm 22) that the screw shafts 3 have reached the timing for maintenance. The load monitoring apparatus 1 according to this fifth embodiment is not provided with such a reset section 19 for resetting the cumulative high load time t1 as in the first embodiment, however it is possible to make artificial resetting outside control.

On the basis of both load mean value Ta and load amplitude value Tw given from the characteristic extracting section 16 the first determining section 17 determines whether the screw shafts 3 are in excess of a threshold value H which is a lower limit of a high load range M and, if the answer is affirmative, it outputs a determination result to the effect of the screw shafts 3 being in a high load condition to the time integrating section 18.

As shown in FIG. 3(b), the high load range M results from multiplying the normal range N in the fatigue evaluation diagram by a safety factor. Although the high load range M lies within the normal range N of the fatigue evaluation diagram, the need of maintenance is recognized because the range M is close to the overload range E. The high load range M in this fifth embodiment is determined on the basis of the threshold value H of the high load range M which results from multiplying the threshold value of the normal range N by a safety factor of 0.85, indicating a region lying within the normal range N and exceeding the threshold value H. The safety factor, which is required at the time of determining the threshold value H of the high load range M, can be set suitably in the range of 0.85 to 1.00.

Whether the screw shafts 3 are in a high load condition or not is determined in the following manner in the first determining section 17. For example, in FIG. 3(b), when the load mean value and load amplitude value are Ta2 and Tw2, respectively, and lie within the normal range N of the fatigue evaluation diagram, it is determined that the screw shafts 3 are in a normal condition (not in a high load condition). Likewise, when the load mean value and load amplitude value are Ta3 and Tw3, respectively, and lie within the high load range M or the overload range E, it is determined that the screw shafts 3 are in a high load condition.

Upon input of a determination result to the effect of the screw shafts being in a high load condition, the time integrating section 18 integrates the time of maintaining the high load condition as a cumulative high load time t1 and outputs it to the protecting section 20.

The protecting section 20 determines whether the inputted cumulative high load time t1 is in excess of a predetermined time tm, then if the answer is affirmative, it announces by the "abnormal" alarm 22 that the screw shafts 3 have reached the timing for maintenance. The predetermined time tm can be set suitably in the range of 10 to 100 hours according to the type of the material to be kneaded and kneading conditions.

The load monitoring method according to this fifth embodiment is carried out in accordance with the steps S81 to S86, as shown in FIG. 8.

First, like the steps S41 to S43 in the first embodiment, the torque T is detected by each torque meter 15 [S81] and there are determined both load mean value Ta and load amplitude value Tw from the detected torque T [S82].

Then, it is determined whether the load mean value Ta and load amplitude value Tw thus determined are in excess of the threshold value H which is a lower limit of the high load range M [S83] and, if the answer is affirmative, the time of maintaining the high load condition is integrated as a cumulative high load time t1 [S84].

Thereafter, it is determined whether the cumulative high load time t1 has exceeded the predetermined time tm [S85] and, if the answer is affirmative, it is determined that the screws 3 have reached the timing for maintenance, whereupon the "abnormal" alarm 22 is issued [S86].

In the load monitoring method according to this fifth embodiment, even when operation is performed within the normal range N determined beforehand correspondingly to the fatigue evaluation diagram, there is determined the cumulative high load time t1 resulting from repetitive addition of load (torque T) values smaller than the load which can induce fatigue fracture, whereby an optimum timing for maintenance is announced. Consequently, maintenance such as flaw detection can be done in an accurate and effective manner before occurrence of fatigue fracture of the screw shafts 3.

Other constructional points, as well as function and effect, of the load monitoring method and load monitoring apparatus according to this fifth embodiment are the same as in the first embodiment.

The present invention is not limited to the above embodiments, but the shape, structure and material of each component, as well as how to combine them, may be changed as necessary within the scope not altering the essence of the present invention.

For example, although in the above embodiments a twin-screw extruder is exemplified as the kneading apparatus, a single screw or three- or more screw extruder or kneader may also be used as the kneading apparatus.

Although in the above embodiments the load monitoring apparatus is installed for both pair of right and left screw shafts, the load monitoring apparatus may be installed for only one screw shaft.

Further, although in the above embodiments the load detectors 7 are each a coupling type torque meter 15, other known load detectors may also be used as the load detectors 7.

What is claimed is:

1. A load monitoring method for a kneading apparatus including a screw shaft, the screw shaft having an input shaft portion to which is transmitted power from a motor and being adapted to knead a material to be kneaded, the load monitoring method comprising:

detecting loads on the input shaft portion by a load detector provided in the input shaft portion of the screw shaft;

averaging the detected loads over a predetermined time section to determine a load mean value and calculating a difference between a maximum value and a minimum value of the loads in the time section to determine a load amplitude value;

determining that the load on the screw shaft is in a normal condition when the thus-determined load mean value and load amplitude value lie within a predetermined normal range, or determining that the load on the screw shaft is in an overload condition when the thus-determined load mean value and load amplitude value do not lie within the predetermined normal range;

in case of the load on the screw shaft being in the overload condition, integrating the time of maintaining the overload condition as an overload duration time;

in case of the load on the screw shaft being in the normal condition, resetting the overload duration time; and when the overload duration time exceeds a set time, performing at least one of issuance of an "abnormal" alarm and stop of rotation of the screw shaft.

2. The load monitoring method for a kneading apparatus according to claim 1, wherein in connection with the issuance of the "abnormal" alarm and the stop of rotation of the screw shaft, a second set time shorter than the set time and set within one minute is newly provided and the "abnormal" alarm is issued upon lapse of the second set time, thereafter, the rotation of the screw shaft is stopped upon lapse of the set time.

3. The load monitoring method for a kneading apparatus according to claim 1, wherein at least one of the issuance of the "abnormal" alarm and the stop of rotation of the screw shaft is performed when the detected load exceeds a predetermined abnormal value.

4. The load monitoring method for a kneading apparatus according to claim 1, wherein the load mean value is given as a fixed value instead of averaging the detected loads over the predetermined time section to obtain a load mean value.

5. A load monitoring method for a kneading apparatus including a screw shaft, the screw shaft having an input shaft portion to which is transmitted power from a motor and being adapted to knead a material to be kneaded, the load monitoring method comprising:

detecting loads on the input shaft portion by a load detector provided in the input shaft portion of the screw shaft;

averaging the detected loads over a predetermined time section to obtain a load mean value and calculating a difference between a maximum value and a minimum value of the loads in the time section to determine a load amplitude value;

determining that the load on the screw shaft is in a high load condition when the load mean value and the load amplitude value exceed a threshold value of a high load region lying in a predetermined normal range;

in case of the load on the screw shaft being in the high load condition, integrating the time of maintaining the high load condition as a cumulative high load time; and when the cumulative high load time exceeds a predetermined time, determining that the screw shaft has reached a timing for maintenance and issuing an alarm.

6. A load monitoring apparatus for a kneading apparatus including a screw shaft, the screw shaft having an input shaft portion to which is transmitted power from a motor and being adapted to knead a material to be kneaded, the load monitoring apparatus comprising:

a load detector provided in the input shaft portion of the screw shaft to detect loads on the input shaft portion;

a characteristic extracting section adapted to average the loads detected by the load detector over a predetermined time section to obtain a load mean value and calculate a difference between a maximum value and a minimum value of the loads in the time section to determine a load amplitude value;

a determining section adapted to determine that the load on the screw shaft is in a normal condition when the load mean value and the load amplitude value obtained by the characteristic extracting section are within a predetermined normal range, or determine that the load on the screw shaft is in an overload condition when the load mean value and the load amplitude value are not within the normal range;

a time integrating section adapted to integrate an overload duration time indicative of the time of maintaining the overload condition when the load on the screw shaft is determined to be in the overload condition by the determining section;

a reset section adapted to reset the overload duration time when the load on the screw shaft is determined to be in the normal condition by the determining section; and a protecting section adapted to perform at least one of issuance of an "abnormal" alarm and stop of rotation of the screw shaft when the overload duration time exceeds a preset time.

7. A load monitoring apparatus for a kneading apparatus including a screw shaft, the screw shaft having an input shaft portion to which is transmitted power from a motor and being adapted to knead a material to be kneaded, the load monitoring apparatus comprising:

a load detector provided in the input shaft portion of the screw shaft to detect loads on the input shaft portion;

a characteristic extracting section adapted to average the loads detected by the load detector over a predetermined time section to obtain a load mean value and calculate a difference between a maximum value and a minimum value of the loads in the time section to determine a load amplitude value;

a determining section adapted to determine that the load on the screw shaft is in a high load condition when the load mean value and the load amplitude value obtained by the characteristic extracting section exceed a threshold value of a high load region lying in a predetermined normal range;

a time integrating section adapted to integrate a cumulative high load time indicative of the time of maintaining the high load condition when the load on the screw shaft is determined to be in the high load condition by the determining section; and a protecting section adapted to announce by an alarm that the screw shaft has reached a timing for maintenance when the cumulative high load time exceeds a predetermined time.

* * * * *